(12) United States Patent
Oeda et al.

(10) Patent No.: US 7,890,610 B2
(45) Date of Patent: Feb. 15, 2011

(54) INFORMATION PROCESSING APPARATUS, NETWORK SYSTEM AND NETWORK SYSTEM CONTROL METHOD

(75) Inventors: Shigeto Oeda, Fujisawa (JP); Mayuko Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1335 days.

(21) Appl. No.: 10/845,592

(22) Filed: May 14, 2004

(65) Prior Publication Data
US 2005/0210155 A1 Sep. 22, 2005

(30) Foreign Application Priority Data
Mar. 19, 2004 (JP) .............................. 2004-079454

(51) Int. Cl.
*G06F 15/16* (2006.01)
(52) U.S. Cl. ...................................... 709/220; 709/218
(58) Field of Classification Search ................. 709/220, 709/222, 218, 22
See application file for complete search history.

(56) References Cited

U.S. PATENT DOCUMENTS

| | | | |
|---|---|---|---|
| 6,725,281 B1 * | 4/2004 | Zintel et al. ................... | 709/224 |
| 6,792,466 B1 * | 9/2004 | Saulpaugh et al. ........... | 709/218 |
| 6,910,068 B2 * | 6/2005 | Zintel et al. ................... | 709/220 |
| 7,089,307 B2 * | 8/2006 | Zintel et al. ................... | 709/224 |
| 7,148,987 B2 * | 12/2006 | Nishio ......................... | 358/1.15 |
| 7,315,886 B1 * | 1/2008 | Meenan et al. ............... | 709/218 |
| 7,337,466 B2 * | 2/2008 | Light et al. ..................... | 726/2 |
| 7,376,723 B2 * | 5/2008 | Cho et al. ..................... | 709/218 |
| 7,693,895 B2 * | 4/2010 | Takayama et al. .... | 707/E17.121 |
| 2002/0027569 A1 * | 3/2002 | Manni et al. ................. | 345/764 |
| 2002/0029256 A1 * | 3/2002 | Zintel et al. ................... | 709/218 |
| 2003/0103226 A1 * | 6/2003 | Nishio ......................... | 358/1.13 |
| 2003/0140344 A1 * | 7/2003 | Bhatti ............................. | 725/62 |

(Continued)

FOREIGN PATENT DOCUMENTS

EP 1 058 422 A1 12/2000

(Continued)

OTHER PUBLICATIONS

Allard, J.; Chinta, V.; Gundala, S.; Richard, G.G., III, "Jini meets UPnP: an architecture for Jini/UPnP interoperability," Applications and the Internet, 2003. Proceedings. 2003 Symposium on , vol., No., pp. 268-275, Jan. 27-31, 2003.*

(Continued)

*Primary Examiner*—Ajay Bhatia
(74) *Attorney, Agent, or Firm*—McDermott Will & Emery LLP

(57) ABSTRACT

An information processing apparatus is used in a network including an information apparatus compatible with the universal-plug-and-play (UPnP) discovery and control method and an information apparatus compatible with the Web based discovery and control method and includes a browser support unit for converting the Web based discovery and control method to the UPnP discovery and control method and a server support unit for converting the UPnP discovery and control method to the Web based discovery and control method. The information apparatus compatible with the UPnP discovery and control method and the information apparatus compatible with the Web based discovery and control method can acquire device information from each other and control the device by each other.

19 Claims, 13 Drawing Sheets

U.S. PATENT DOCUMENTS

| | | |
|---|---|---|
| 2003/0217136 A1* | 11/2003 | Cho et al. .................. 709/223 |
| 2003/0217236 A1 | 11/2003 | Rowlands |
| 2004/0205172 A1* | 10/2004 | Kim ........................... 709/222 |
| 2005/0010689 A1* | 1/2005 | Henry et al. ................ 709/246 |
| 2005/0108331 A1* | 5/2005 | Osterman ................... 709/205 |
| 2006/0167898 A1* | 7/2006 | Muramatsu et al. ........... 707/10 |
| 2006/0282513 A1* | 12/2006 | Saint-Hilaire et al. ....... 709/218 |
| 2007/0156708 A1* | 7/2007 | Takayama et al. ............. 707/10 |
| 2007/0162586 A1* | 7/2007 | Kim ........................... 709/223 |
| 2007/0263248 A1* | 11/2007 | Oshima et al. ............. 358/1.15 |

FOREIGN PATENT DOCUMENTS

| | | |
|---|---|---|
| EP | 1 286 260 A1 | 2/2003 |
| FR | 2845229 A1 * | 4/2004 |
| JP | 2003-030072 | 1/2003 |
| JP | 2003-46535 A | 2/2003 |
| JP | 2003-208366 | 7/2003 |
| JP | 2004349895 A * | 12/2004 |
| WO | WO 2004/008686 A1 | 1/2004 |

OTHER PUBLICATIONS

Dong-Sung Kim; Jae-Min Lee; Wook Hyun Kwon; In Kwan Yuh, "Design and implementation of home network systems using UPnP middleware for networked appliances," Consumer Electronics, IEEE Transactions on , vol. 48, No. 4, pp. 963-972, Nov. 2002.*

Miller, B.A.; Nixon, T.; Tai, C.; Wood, M.D., "Home networking with Universal Plug and Play," Communications Magazine, IEEE , vol. 39, No. 12, pp. 104-109, Dec. 2001.*

Schneider, G.; Hoymann, C.; Goose, S., "Adhoc personal ubiquitous multimedia services via UPNP," Multimedia and Expo, 2001. ICME 2001. IEEE International Conference on , vol., No., pp. 901-904, Aug. 22-25, 2001.*

UK Combined Search and Examination Report for application No. GB0410988.0 dated Nov. 8, 2004.

* cited by examiner

INFORMATION PROCESSING APPARATUS, NETWORK SYSTEM AND NETWORK SYSTEM CONTROL METHOD

The present application claims priority from Japanese application JP2004-079454 filed on Mar. 19, 2004, the content of which is hereby incorporated by reference into this application.

BACKGROUND OF THE INVENTION

The present invention relates to a method for controlling an information processing apparatus such as a home electric appliance and a personal computer (PC) connected to a network and in particular, to an information processing apparatus and a control method for realizing control between information processing apparatuses of different control methods in a network configuration having a plurality of information processing apparatuses of different control methods.

Conventionally, as the technique relating to a control method of an information processing apparatus in a network system having a plurality of control methods, for example, JP-A-2003-46535 discloses a network system having two networks connected to apparatuses of two connection methods: the home audio/video control (AV/C) which is a control method of an AV device and a universal plug and play (UPnP). By providing means for connecting to the network connected to the device of the UPnP discovery and control method, means for connecting to the network connected to the device of the AV/C method, and conversion means for converting a command of the UPnP discovery and control method into a command of the AV/C control method, the information processing apparatus compatible of the UPnP discovery and control method and the information processing apparatus compatible of the AV/C control method control the partner information processing apparatus.

By using the aforementioned conventional technique, in a network system including devices of the two control methods, i.e., AV/C and UPnP, it is possible to realize control of devices of the AV/C and the UPnP discovery and control methods by each other. However, no consideration is taken on the interavailability between the device compatible with the control method (Web based discovery and control method) of the device using the Web browser function and Web server function which are widely used as the Internet use method and the device compatible with the UPnP discovery and control method whose compatibility is advanced in the information processing device such as a PC.

Moreover, in the control method using the UPnP (UPnP discovery and control method), in order to realize control of the information processing device via the Web browser (or html (hyper text markup language) browser, hereinafter referred to as Web browser), the information (URL information) for accessing by the Web browser is defined in the UPnP discovery and control method (presentation URL information). By using this information, URL information is acquired if the information processing device is compatible with the UPnP and this URL information is specified by using the Web browser, so that the information processing device as a target can be controlled.

Control of the information processing device via the Web browser using the presentation URL information of the UPnP discovery and control method assumes that the information processing device B controlling the information processing device A compatible with the UPnP discovery and control method via the Web browser is compatible with the UPnP discovery and control method, and no consideration is taken on the control of the information processing device A compatible with the UPnP from the information processing device C of the Web based discovery and control method not compatible with the UPnP discovery and control method.

Furthermore, no consideration is taken on the control of the information processing device D having the Web server (or hypertext transfer protocol (http) server) function of the Web based discovery and control method not compatible with the UPnP discovery and control method from the information processing device E compatible with the UPnP discovery and control method having the Web browser because the information processing device D cannot provide URL information for accessing, for use of the Web browser, the information processing device E using the UPnP discovery and control method.

SUMMARY OF THE INVENTION

It is therefore an object of the present invention to provide an information processing apparatus and a control method capable of interactive control between the information processing apparatus (browser device) having the Web browser compatible with a Web based discovery and control method or the information processing apparatus (server device) having the Web server and the information processing apparatus (device unit) as a control object compatible with the UPnP discovery and control method or the information processing apparatus (control device) as a control subject compatible with the UPnP discovery and control method.

It should be noted that in the present invention explained below, the browser device and the server device are treated as separate information processing apparatuses. However, an information processing apparatus having both of the browser function and the server function can also be controlled/used by the same method and treated by the present invention. Similarly, the device unit and the control device are handled as separate information processing apparatuses but an information processing apparatus having both of the control object function and the control subject function by the UPnP discovery and control method can also be controlled/used by the same method and treated by the present invention.

The main object of the present invention is to provide an information processing apparatus or a control method or a network system capable of performing interactive control between a server device or a browser device as an information processing apparatus compatible with the Web based discovery and control method which is a control method of a device using the Web browser function or the Web server function, and a device unit and a control device which are information processing apparatuses compatible with the UPnP discovery and control method which is a control method of a device connected to the network. For this, the information processing apparatus of the present invention includes a browser support unit for controlling the device unit and realizing control from the browser device and a server support unit for controlling the server device and realizing control from the control device and the device unit.

One of the main functions of the browser support unit of the present invention is to convert the access information to the Web server function accessible by the Web browser provided by the device unit, into access information usable by the browser device and provide it to the browser device.

One of the main functions of the server support unit of the present invention is to convert access information such as URL information to the Web server device usable by the Web browser provided by the server device, into information usable by the control device having the Web browser and provide it to the control device.

According to the present invention having the aforementioned means, the information processing apparatus connected to the network includes a browser support function, so that the device unit compatible with the UPnP discovery and control method can be controlled/used from the browser device compatible with the Web based discovery and control method. Thus, in the network system including the information processing apparatus compatible with the UPnP discovery and control method and the information processing apparatus compatible with the Web based discovery and control method using the Web browser, both of the devices can be used, thereby improving the user-friendliness of the device control.

Furthermore, according to the present invention, by providing the server support function in the information processing apparatus connected to the network, it becomes possible to control/use the server device compatible with the Web based discovery and control method from the control device and device unit compatible with the UPnP discovery and control method. Thus, in the network system including the information processing apparatus compatible with the UPnP discovery and control method and the information processing apparatus compatible with the Web based discovery and control method using the Web server, it becomes possible to utilize both of the devices, thereby improving the user-friendliness of the device control.

The present invention can provide a network system having a high user-friendliness.

Other objects, features and advantages of the invention will become apparent from the following description of the embodiments of the invention taken in conjunction with the accompanying drawings.

DESCRIPTION OF THE EMBODIMENTS

In a network system including an information processing apparatus compatible with an UPnP discovery and control method and an information processing apparatus compatible with a Web based discovery and control method, there are provided an information processing apparatus and a control method for realizing control between the information processing apparatuses of the different control methods.

Embodiment 1

Figure 1:
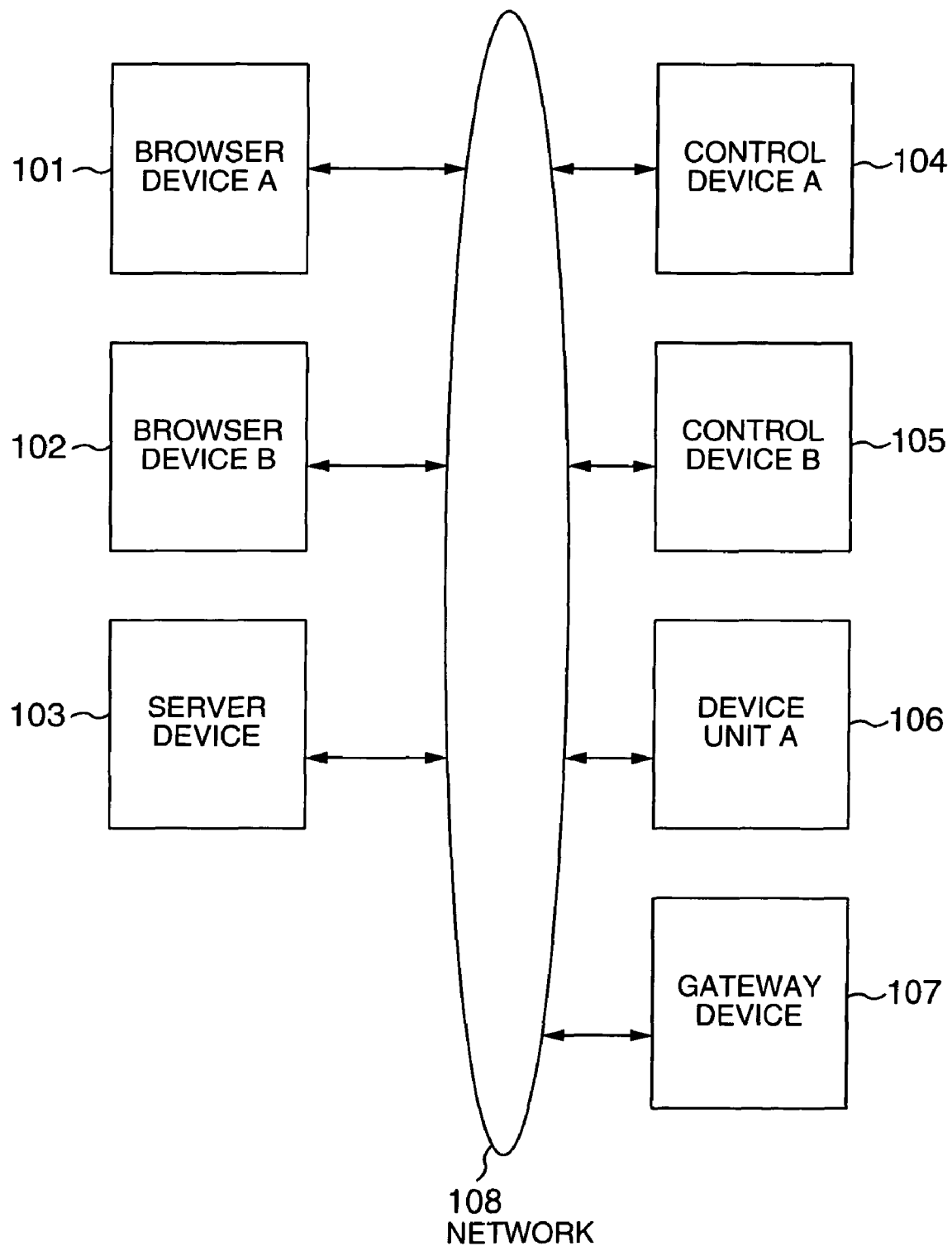
FIG. 1 shows a network configuration.
Figure 2:
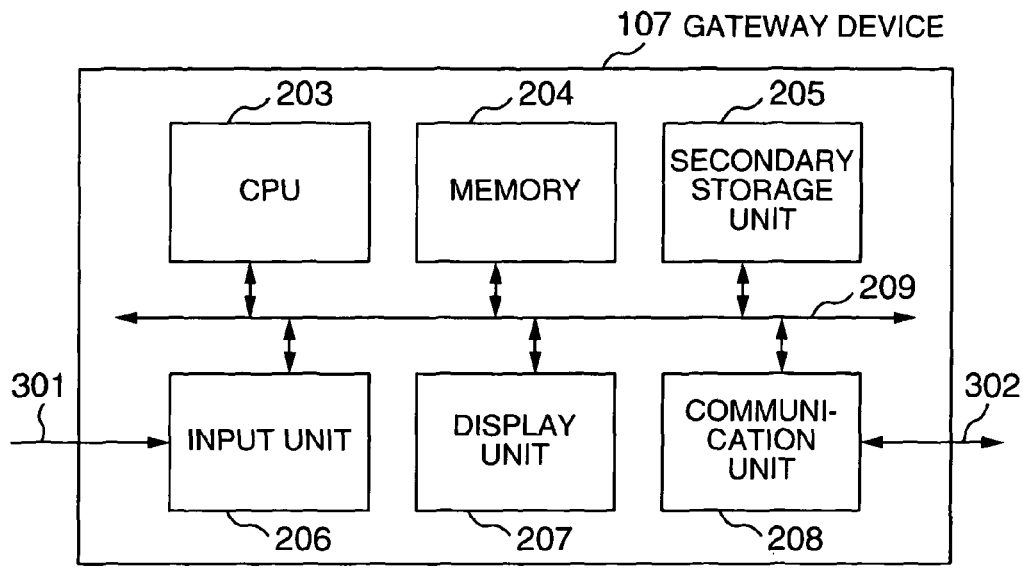
FIG. 2 shows a system configuration.
Figure 3:
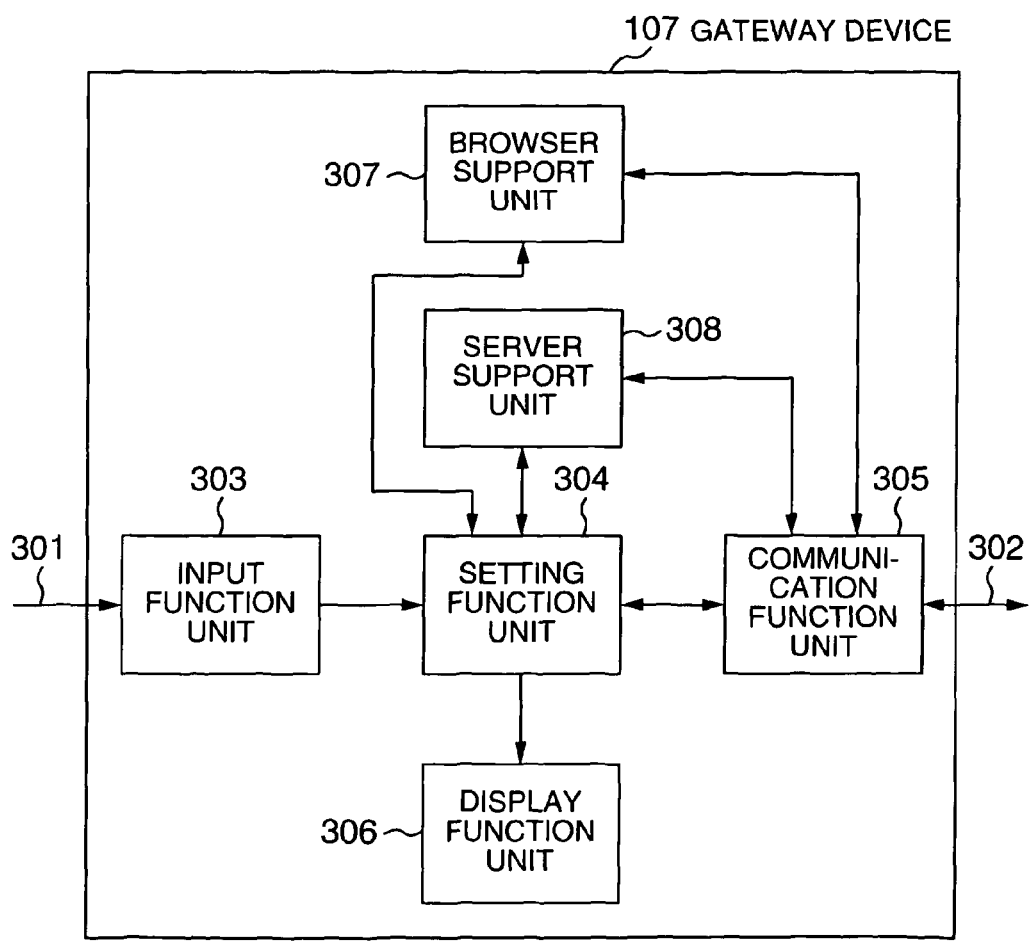
FIG. 3 is a gateway device system block diagram.
Figure 4:
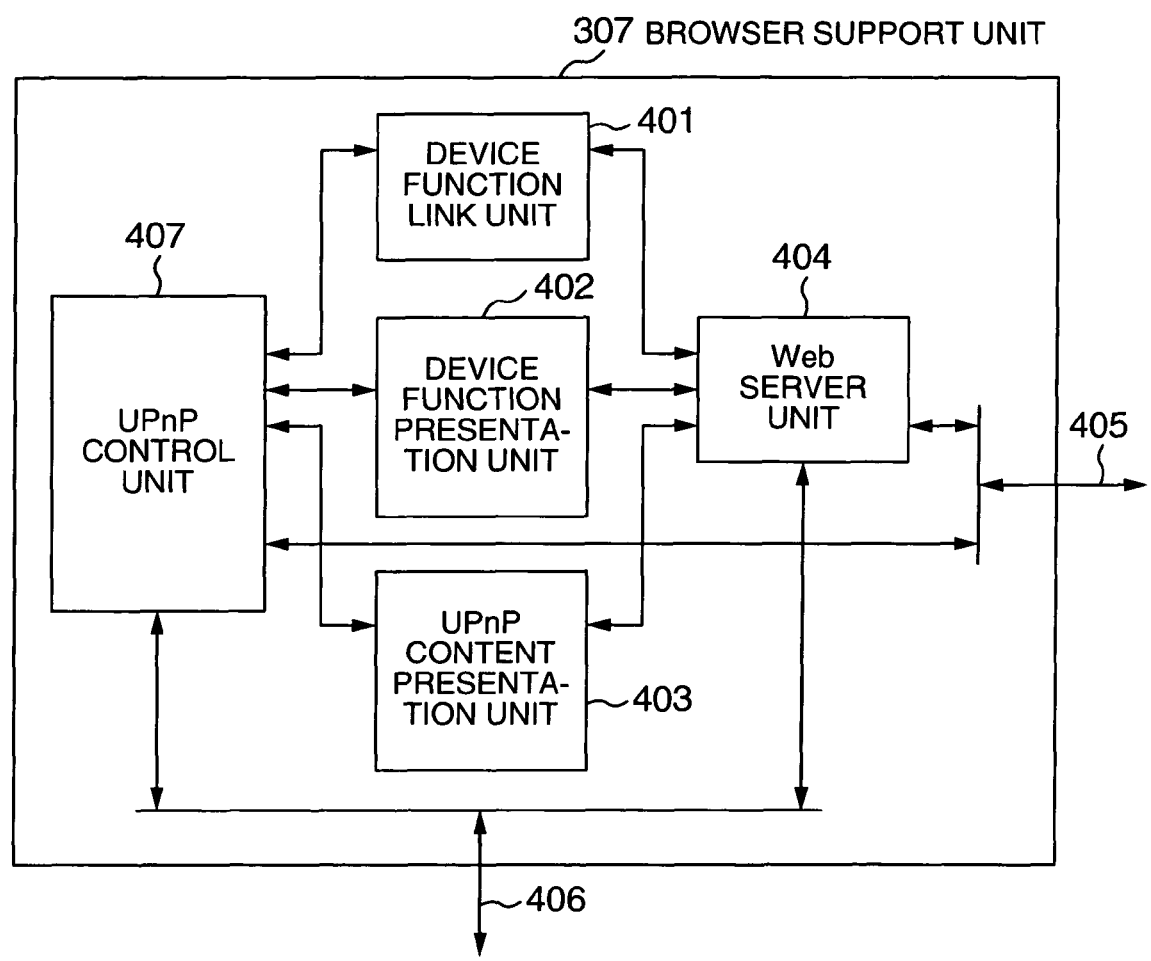
FIG. 4 is a browser support unit block diagram.
Figure 5:
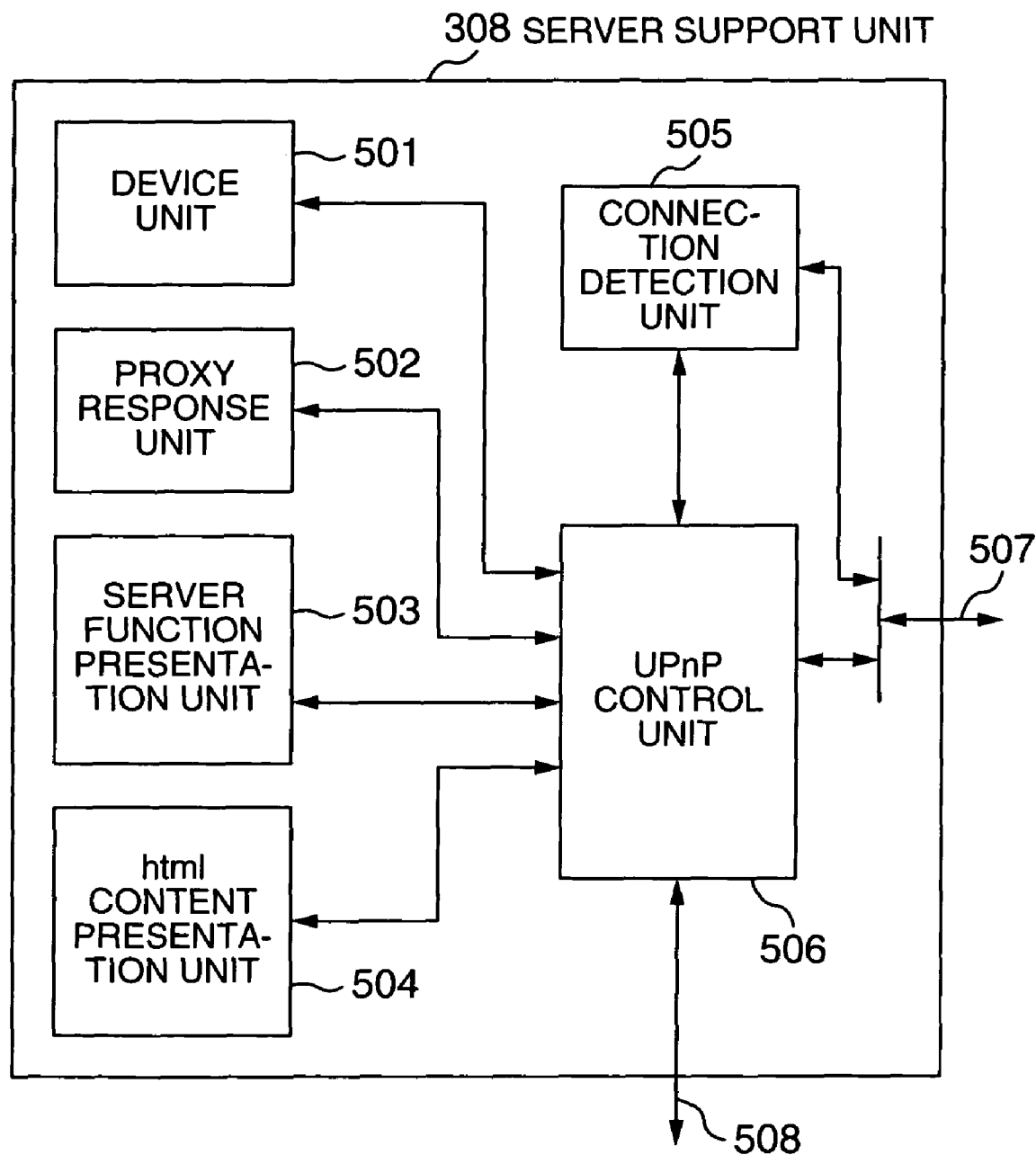
FIG. 5 is a server support unit block diagram.
Figure 6:
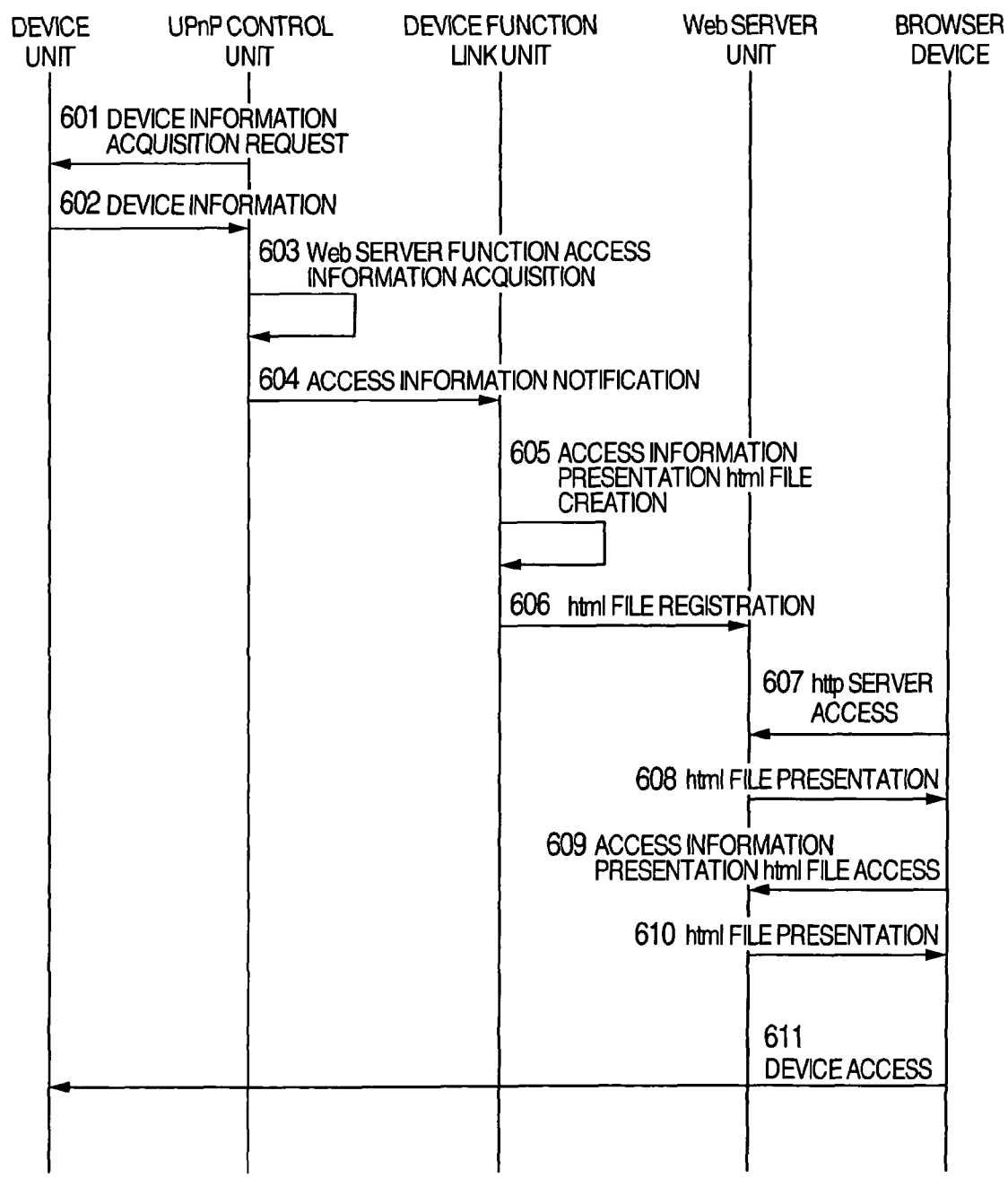
FIG. 6 is a browser support unit processing flowchart.
Figure 7:
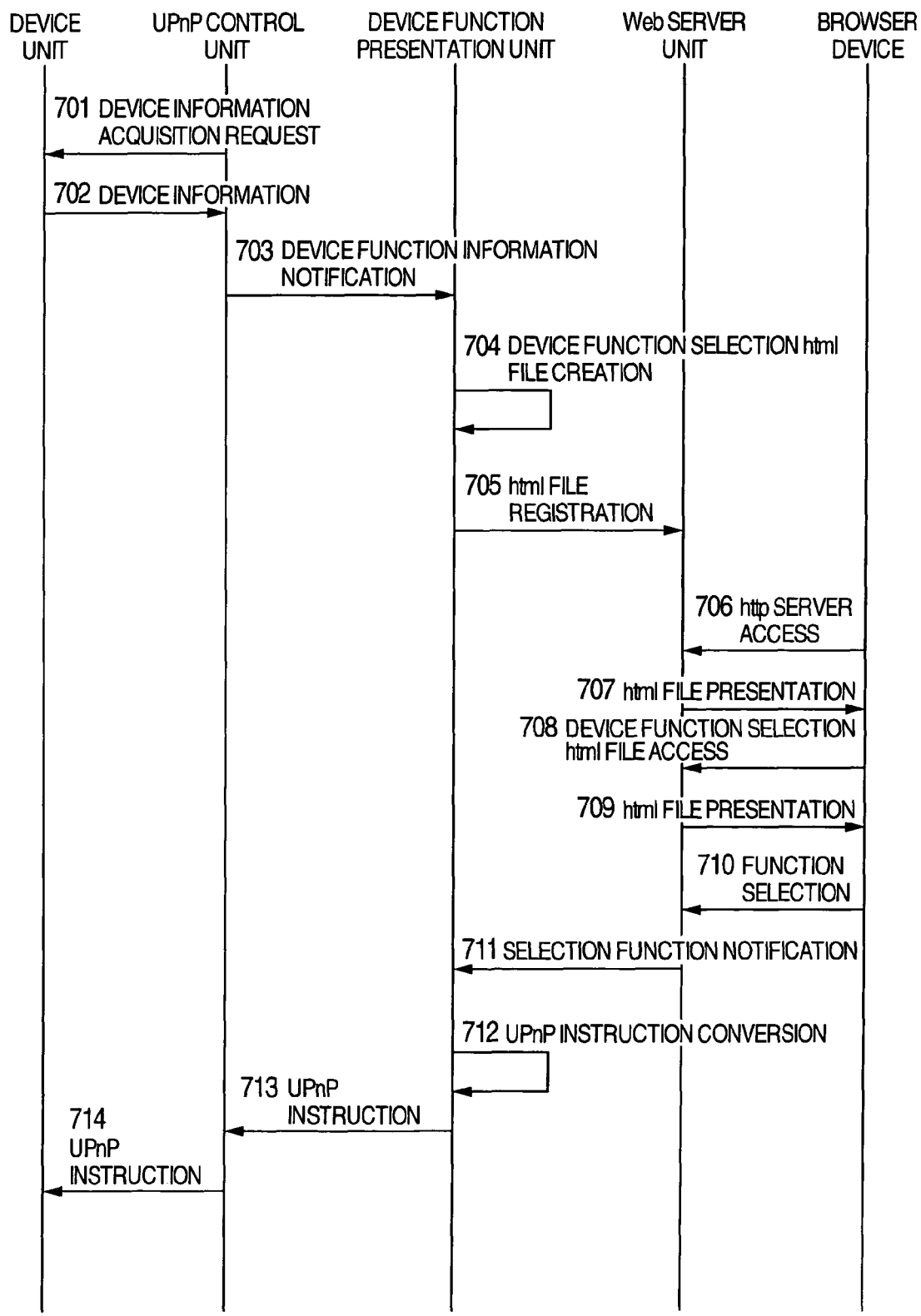
FIG. 7 is a browser support unit processing flowchart.
Figure 8:
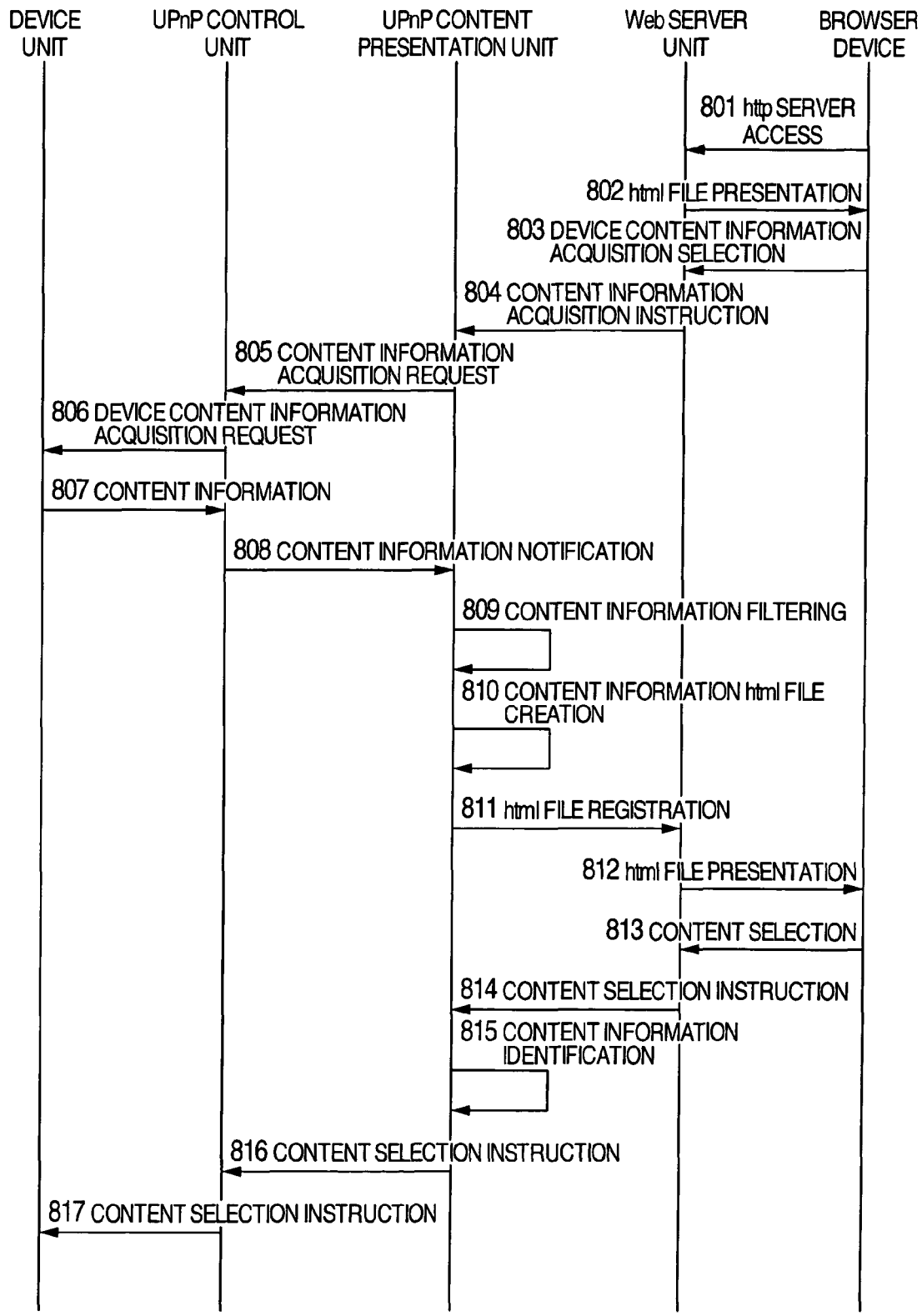
FIG. 8 is a browser support unit processing flowchart.
Figure 9:
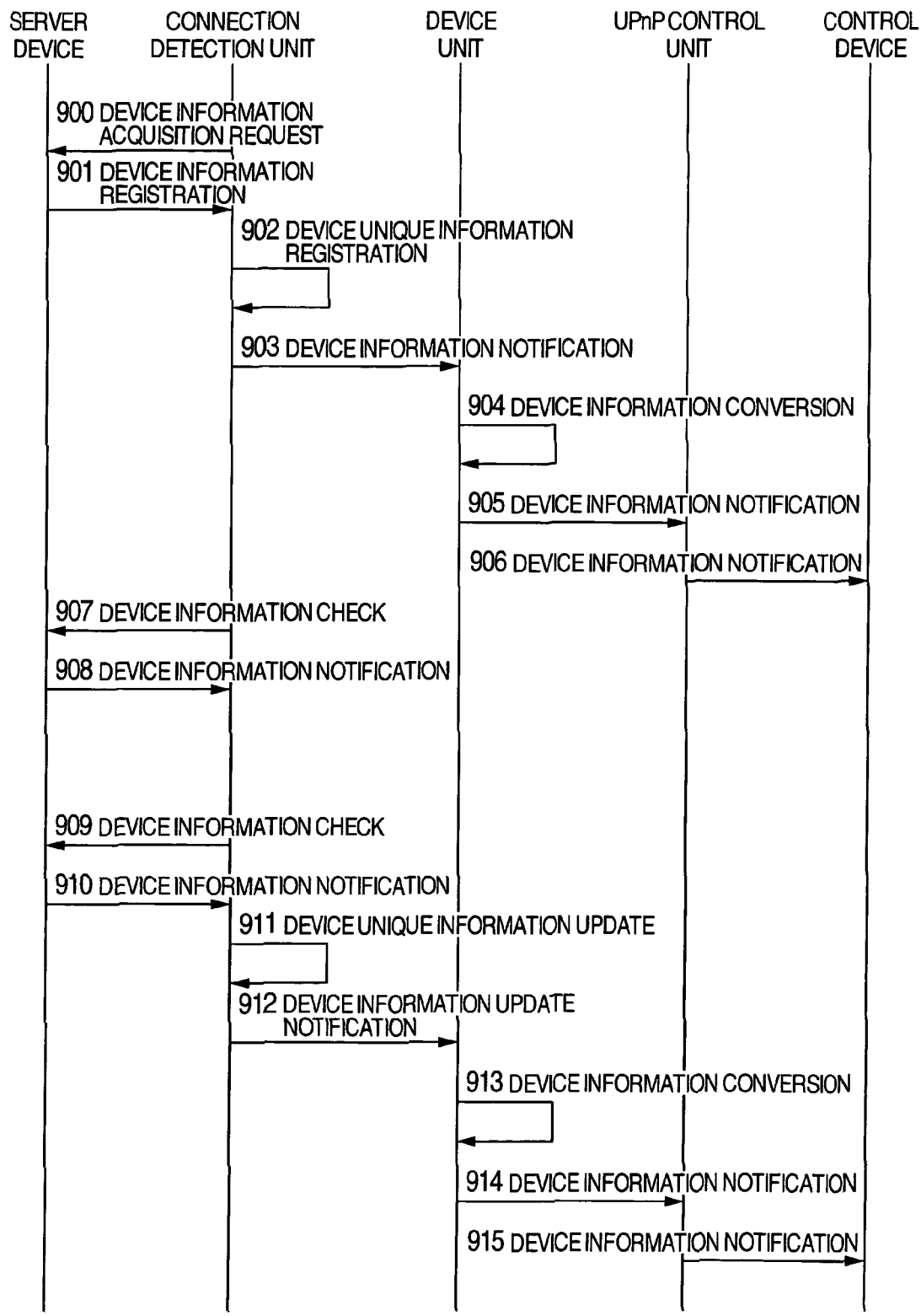
FIG. 9 is a server support unit processing flowchart.
Figure 10:
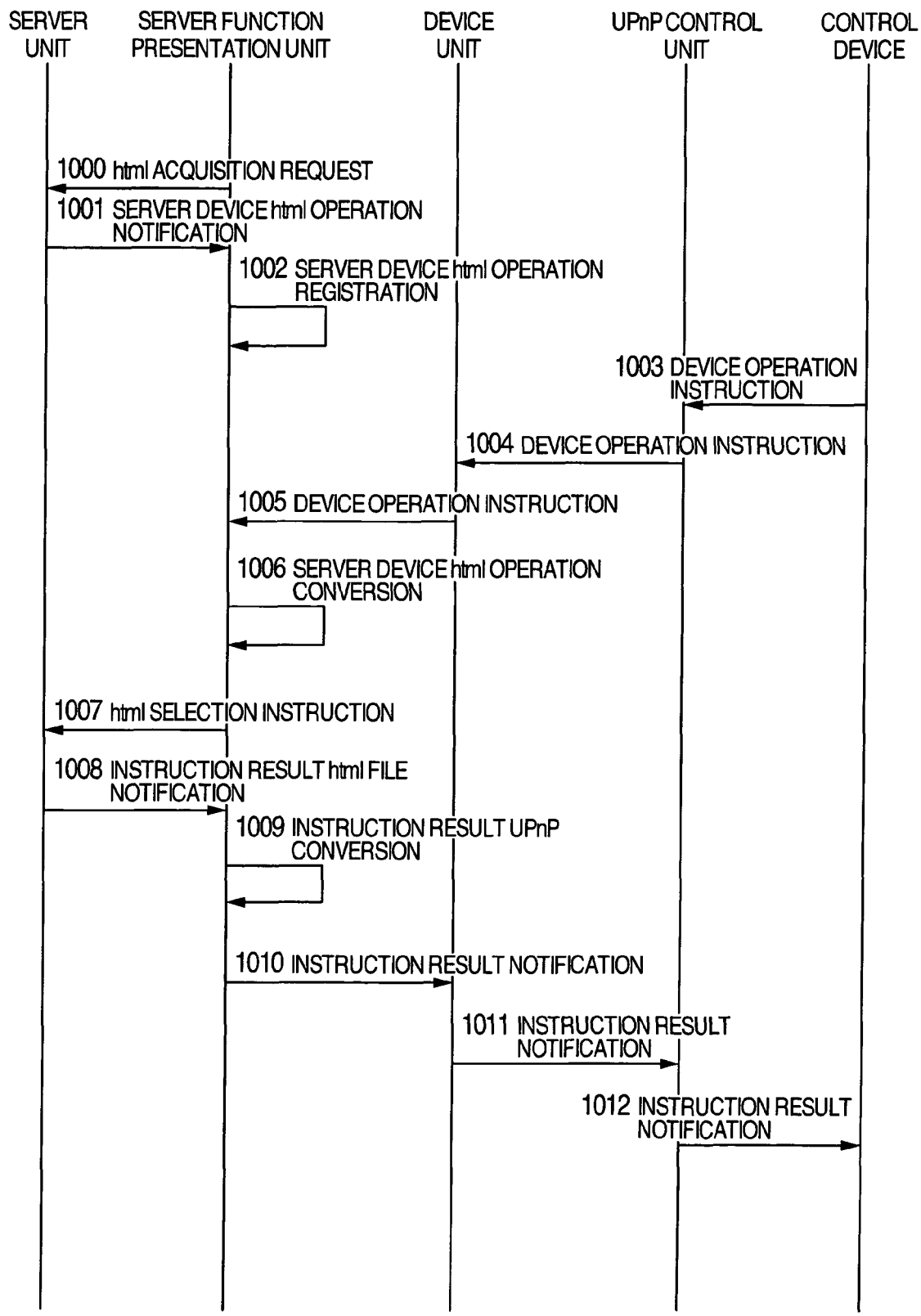
FIG. 10 is a server support unit processing flowchart.
Figure 11:
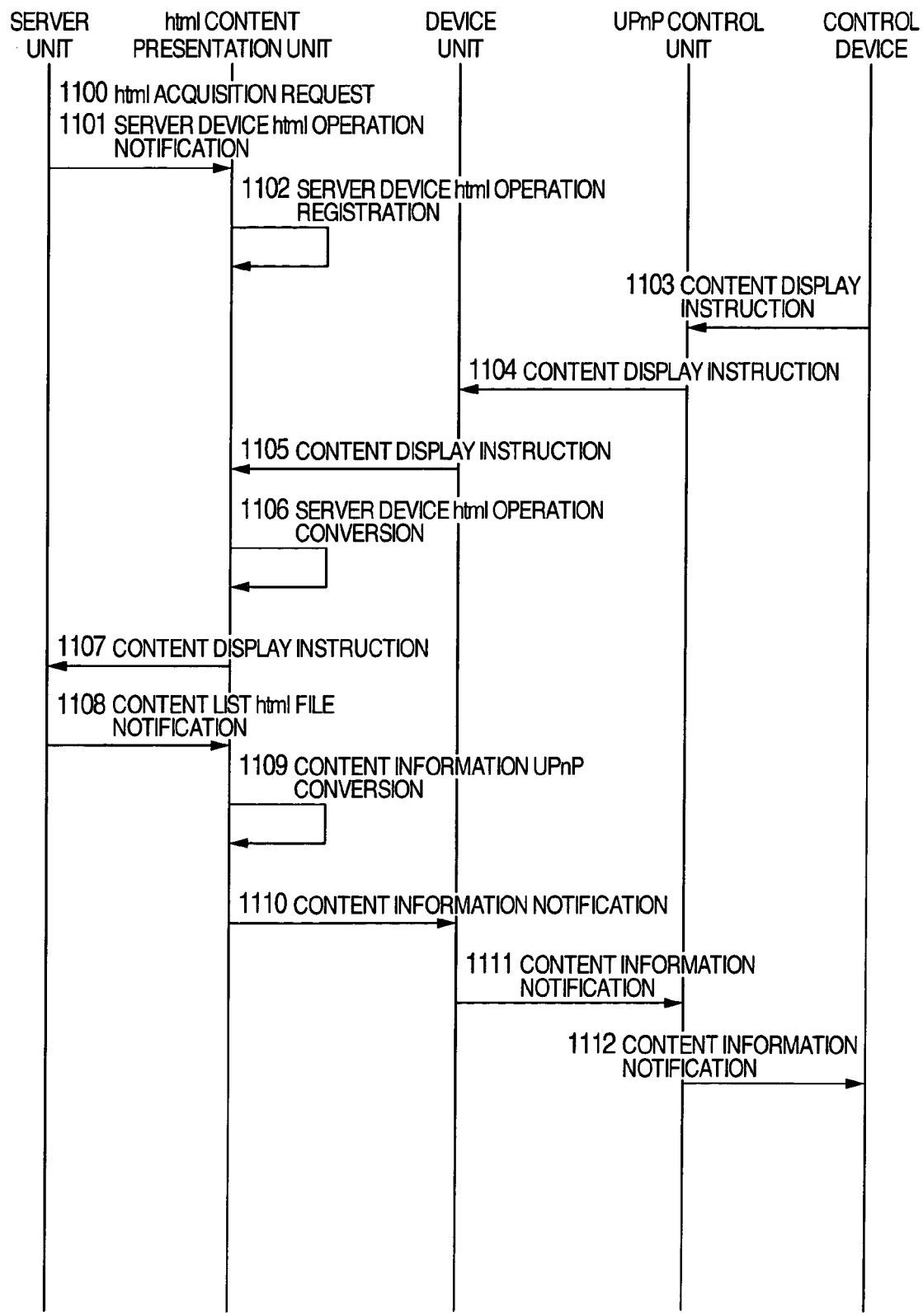
FIG. 11 is a server support unit processing flowchart.

Description will now be directed to a first embodiment of the present invention with reference to FIG. 1 to FIG. 11. FIG. 1 shows a network configuration of an information processing apparatus (hereinafter, referred to as a gateway device) of the present invention. FIG. 2 shows a system configuration showing hardware configuration of the gateway device connected to the network of FIG. 1. FIG. 3 is a system block diagram showing the functional configuration of the gateway device. FIG. 4 is a block diagram showing the functional configuration of browser support unit of the gateway device. FIG. 5 is a block diagram showing the functional configuration of the server support unit of the gateway device. FIG. 6 to FIG. 8 are processing flowcharts for explaining operation of the browser support unit. FIGS. 9 to 11 are processing flowcharts for explaining operation of the server support unit.

In FIG. 1, reference numerals 101 and 102 represent browser devices such as PC and home electric appliances as control subject compatible with the Web based discovery and control method; 103 denotes a server device as a control object compatible with the Web based discovery and control method; 104 and 105 represent control devices as control subjects compatible with the UPnP discovery and control method; 106 denotes a device unit as a control object compatible with the UPnP discovery and control method; 107 denotes a gateway device capable of controlling to connect a device to both of the UPnP discovery and control method and the Web based discovery and control method of the present invention; and 108 denotes a network as communication unit connecting the devices.

In FIG. 2, the reference numeral 107 denotes a gateway device of the present invention; 203 denotes a CPU performing control of the entire device; 204 denotes a memory for storing a program and data; 205 denotes a secondary storage unit such as a hard disc; 206 denotes an input unit such as a touch panel and a keyboard; 207 denotes a display unit such as a liquid crystal controller and a liquid crystal display; and 208 denotes a communication unit for performing communication with another device via the network 108. A reference numeral 209 denotes a system bus for interconnecting the CPU 203, memory 204 and the like.

In FIG. 3, the reference numeral 107 denotes a gateway device of the present invention; 303 denotes an input unit for acquiring the input of a user and notifying it to a setting function unit 304; the setting function unit 304 is used to set operation of the network device 108; 305 denotes a communication function unit for performing communication with another device via the network; 206 denotes a display function unit for controlling output of the display information; 307 denotes a browser support unit for supporting use of the UPnP-compatible device from the browser device; and 308 denotes a server support unit for supporting use of the server device from the UPnP-compatible device. A reference numeral 301 denotes input information of a user input to the input unit 303. A reference numeral 302 denotes input and output information to the communication function unit 305 on the network 108. The constituting units of FIG. 3 are realized by the hardware shown in FIG. 2 and software using it. For example, the communication function unit 305 is generally composed of the communication unit 208 for realizing connection to the physical network and data transmission/reception and a program for realizing a communication protocol arranged in the memory 204. Similarly, the display function unit is generally realized by the display unit 207 for displaying display data in the actual device and a program arranged in the memory 204 for performing management/control of the display content such as the Window system. Moreover, the browser support unit 307 and the server support unit 308 can be realized by the format of the program executed by the CPU 203 arranged in the memory 204.

Hereinafter, explanation will be given on the present embodiment with reference to FIG. 4. The reference numeral 407 denotes a UPnP control unit connected to the communication function unit 305 via the I/O 405 connected to the setting function unit 304 via an I/O 406 and capable of setting the function, and performing transmission/reception of the UPnP information to/from the device compatible with the UPnP discovery and control method. The reference numeral 404 denotes a Web server unit connected to the communication function unit 305 via the I/O 405 and performing transmission/reception of information to/from the browser device.

The reference numeral 401 denotes a device function link unit for supporting URL information acquisition of the device from the browser device. Hereinafter, explanation will be given on the operation of the device function link unit 401 with reference to FIG. 6.

In FIG. 6, the UPnP control unit, the device function link unit, and the Web server unit respectively correspond to the units in FIG. 4 and constitute the browser support unit 307. The browser support unit 307 is arranged in the gateway device 107 and performs communication with the device unit and browser device in FIG. 6 via the network. It should be noted that the browser device is the browser device 101 or 102 in FIG. 1 or other browser device not depicted. Similarly, the device unit may be the device unit 106 in FIG. 1 or other device unit not depicted.

In FIG. 6, firstly in step 601, the UPnP control unit 407 in the browser support unit 307 of the gateway device 107 requests via the communication function unit 305 the device specified by the protocol of the UPnP discovery and control method (hereinafter, referred to the UPnP protocol) to acquire device information. In step 602, the device unit specified responds the device information to the UPnP control unit 407. In step 603, the UPnP control unit 407 acquires information whether the device unit has the Web server function and the URL information on the Web server function. Hereinafter, with reference to FIG. 6, explanation will be given on the operation when the device unit has the Web server function. In step 604, the UPnP control unit 407 notifies the acquired URL information as the access information to the device function link unit 401. In step 605, the device function link unit 401 generates a html file (Web page) so that the acquired access information can be used from the Web browser function of the browser function. In step 606, the html file presenting the generated access information is registered in the Web server unit 404. Hereinafter, in steps 607 to 610, the browser device acquires the html file by using the Web browser function and acquires the access information (URL information) on the device unit. In step 611, by specifying the access information acquired, the browser device can access the information presented by the Web server function of the device unit and the it becomes possible to acquire information on the device unit and control the device unit, i.e., the device function can use the function provided via the Web server.

Thus, the device function link unit 401 enables control of the device unit of the UPnP discovery and control method from the browser device of the Web based discovery and control method, thereby improving the user-friendliness of the device control.

Next, with reference to FIG. 7, explanation will be given on the operation of the device function presentation unit 402. The device function presentation unit supports control from the browser function of the device unit having no Web server function.

In steps 701 and 702, the UPnP control unit 407 specifies a device function and the UPnP protocol acquires the device information. In step 703, the acquired device function is notified to the device function presentation unit 402. In step 704, the device function presentation unit 402 generates, according to the device information acquired, an html file realizing the function selection for function control of the device unit from the browser device. The html file generated in step 705 is registered in the Web server unit 404. In steps 706 to 710, by using the browser function of the browser device, the html is acquired and utilized so as to instruct function control of the device unit. In step 711, the browser device converts the function selection to the device unit selected via the Web browser to the corresponding function selection notification and notifies it to the device function presentation unit 402. The function notified in step 712 is converted to the corresponding UPnP instruction and notified to the UPnP control unit 407 in step 713. In step 714, the UPnP instruction is notified to the device unit and a predetermined control is performed in the device unit.

Thus, by using the device function presentation unit 402, the browser function of the Web based discovery and control method can control the device unit of the UPnP discovery and control method having no Web server function, thereby improving the user-friendliness of the device control.

Next, with reference to FIG. 8, explanation will be given on the operation of the UPnP content presentation unit 403. The UPnP content presentation unit 403 supports use of the content information owned by the device unit from the browser function. In the processing of FIG. 8, it is assumed that the device unit information cannot be acquired from the browser device by the processing not depicted but similar to FIG. 6 or FIG. 7.

In steps 801 and 802, the html file of the function control of the device unit is acquired and is displayed by the Web browser function of the browser device. In step 803, a user or a program selects content information acquisition from the html file. In step 804, the Web server unit 404 instructs content information acquisition to the UPnP content presentation unit 403. In step 805, the UPnP content presentation unit 403 notifies the content information acquisition request for the device unit specified in advance to the UPnP control unit 407. In steps 806 and 807, the UPnP control unit 407 requests content information acquisition to the pre-specified device unit by the UPnP protocol and acquires content information. In step 808, the UPnP control unit 407 notifies the acquired content information to the UPnP content presentation unit 403. The UPnP content presentation unit 403 judges which of the content information sets acquired in step 809 can be utilized by the browser device and excludes the ones that cannot be utilized by filtering processing. In step 810, from the content information as the filtering result, an html file usable by the Web browser can be generated. In step 811, the html file is registered in the Web server unit 404. In step 812, the html file is provided to the browser device. In the browser device, the html file acquired is displayed by the browser function. In step 813, the user or the program selects a content from content information provided by the html file. In step 814, the Web server unit 404 notifies the instructed content information to the UPnP content presentation unit 403. In step 815, UPnP content presentation unit 403 specifies the instructed content information. In step 816, the content information specified is notified to the UPnP control unit 407. In step 817, the UPnP control unit 407 notifies the content instruction to the device unit by the UPnP protocol. After this, the device unit provides the content information to the browser device by the step not depicted here.

As has been described above, the UPnP content presentation unit 403 can acquire the content information on the device unit of the UPnP discovery and control method from the browser device of the Web based discovery and control method, thereby improving the user-friendliness.

It should be noted that in this embodiment the content-associated information acquired by the UPnP content presentation unit is subjected to filtering before presented to the browser device. However, it is also possible to present without performing filtering. The method for presenting the content-associated information is not limited to the method of the embodiment.

Hereinafter, with reference to FIG. 5, explanation will be given on the present embodiment. In FIG. 5, the reference numeral 506 denotes a UPnP control unit connected to the communication function unit 305 via the I/O 507 connected with the setting function unit 304 via an I/O 508 and capable of setting the function, and performing transmission/reception of the UPnP information to/from a device compatible with the UPnP discovery and control method. Similarly, the reference numeral 505 denotes a connection detection unit connected to the communication function unit 305 via the I/O 507 and detects disconnection of the server device from the network.

The reference numeral 501 denotes a device unit for showing the server device of the Web based discovery and control method virtually as a device unit of the UPnP discovery and control method. Hereinafter, with reference to FIG. 9, explanation will be given on the operation of the device unit 501 and the connection detection unit 505.

The connection detection unit, the device unit, and the UPnP control unit of FIG. 9 correspond to the corresponding units of FIG. 5 and constitute a server support unit. The server support unit 308 is arranged in the gateway device 107 and performs communication with the server device and the control device of FIG. 9 via the network. It should be noted that the server device is assumed to be the 103 of FIG. 1 or other server device not depicted. Similarly, the control device is assumed to be the 104 or the control device 105 of FIG. 1 or other control device not depicted.

Firstly, a server device is specified by the gateway device in a pre-process not depicted. In steps 900 and 901, the server device notifies the device information via the network to the connection detection unit 505 by protocol of the Web based discovery and control method (hereinafter, referred to as a Web protocol). The connection detection unit 505, in step 902, acquires or calculates the device unique information from the device information and registers it. Next, in step 903, the device information acquired from the server device is notified to the device unit 501. In step 904, the device unit 501 converts the acquired device information into a format based on the UPnP protocol and registers it. By this registration, the device unit 501 operates as a virtual UPnP device unit of the server device. In step 905, the device unit notifies the server device information on the UPnP protocol registered to the UPnP control unit 506. In step 906, the UPnP control unit 506 notifies the acquired device information to the control device by the UPnP protocol.

In steps 907 and 908, the connection detection unit 505 inquires the server device about the device information and confirms that the device unique information has not been modified. Similarly in step 909 and 910, the connection detection unit 505 inquires the server device about the device information and in this embodiment, modification of the device unique information is detected. After this, in steps 911 to 915, by the processes like the processes of step 902 to 906, the device unique information is updated ad the updated device information is notified to the control device.

Moreover, in this embodiment, the connection detection unit 505 uses the device information notified by the Web protocol as a base and from here, the device unique information is acquired for identifying the respective server devices. However, it is also possible to acquire device unique information from the information acquired by a protocol other than the UPnP protocol. For example, it is possible to utilize the IP (Internet protocol) address information used in the TCP/IP protocol, the MAC address (media access control address) information unique to the device and coordinating to the IP address information, the device name information set for the device and the like as device unique information. As has been described above, the device unique information acquisition method, the acquisition protocol, and the device unique information utilized are not limited to the configuration of the present embodiment.

Moreover, in the present embodiment, the specification method before registration of the server device may be specified by a user in advance. For example, like the specific port number in the TCP/IP, a network device satisfying a specific network condition is periodically searched. The server device specification method is not limited to this.

As has been described above, by the connection detection unit 505 and the device unit 501, the control device of the UPnP discovery and control method can recognize and utilize the server device of the Web based discovery and control method, thereby improving the user-friendliness. It should be noted that in the device unit, it is also possible to define the virtual device by using the embedded device function defined in the UPnP discovery and control method.

Next, explanation will be given on the operation of a proxy response unit 502. When a control request or a state acquisition request of a particular server device is made from the control device to the device unit 501, the server device is not directly inquired and the proxy response unit 502 takes at least a part of the response. For example, when a state acquisition request concerning a server power state is generated from a plurality of control devices, the proxy response unit 502 instructs the first state acquisition request as a device information acquisition request for the server device, acquires the device information for the power state from the server device, and responds it to the control device. However, for the second power state acquisition request and after, if it is generated within a predetermined period from the first power state acquisition request, the device information acquisition request to the server is not performed and the power state acquired first is responded to the control device.

Thus, when controlling the server device of the Web based discovery and control method from the control device of the UPnP discovery and control method by the proxy response unit 502, it is possible to reduce the various requests for the server device and reduce the network load.

The reference numeral 503 denotes a server function presentation function for converting the Web server function of the server device into the device control command of the UPnP protocol. Hereinafter, with reference to FIG. 10, explanation will be given on the server function presentation function 503.

In steps 1000, 1001, 1002, the server function presentation unit 503 registers the html file associated with the control method of the server device notified by the server device. The operation instruction of the server device of the UPnP protocol notified to the UPnP control unit 506 by the control device in step 1003 is notified to the device unit 501 in step 1004, and is notified to the server function presentation unit 503 from the device unit 501 operating as the virtual server device corresponding to the UPnP discovery and control method in step 1005. The server function presentation unit 503 compares the operation instruction notified in step 1006 to the html file information registered and converts it to the html operation of the server device. In step 1007, according to this conversion result, the html file of the server device is selected. Thus, the server device of the Web based discovery and control method can be controlled from the control device of the UPnP discovery and control method. In step 1008, the result of the operation instruction is notified as the html file to the server support unit 308 of the gateway device 107. In steps 1009 and 1010, the server function presentation unit 503 converts the result of the operation instruction acquired into the UPnP format and notifies nthe result of the operation instruction converted into the UPnP format to the device unit 501. In step 1011, the device unit 501 operates as a virtual device unit of the server device and notifies the result of operation instruction to the UPnP control unit 506. In step 1012, the UPnP control unit 506 notifies the result of the operation instruction acquired to the control device.

Thus, by the server function presentation unit 503, the device control of the server device of the Web based discovery and control method can be performed from the control device of the UPnP discovery and control method. Furthermore, even when the control device has no Web browser function for the device control, it is possible to control the server device by the UPnP discovery and control method not using the Web browser function, thereby improving the user-friendliness.

The reference numeral 504 denotes an html content presentation unit enabling use of the content information held by the server device of the Web based discovery and control method from the control device of the UPnP discovery and control method. Hereinafter, explanation will be given on the operation of the html content presentation unit 504 with reference to FIG. 11.

Firstly, by the processes like steps 1000, 1001, and 1002 shown in FIG. 10, the html content presentation unit 504 acquires the html file concerning the control method of the server device from the server device and registers it in the html content presentation unit 504 in steps 1100, 1101, and 1102. In step 1103, the control device notifies the content display instruction to the UPnP control unit 506 by the UPnP protocol. In step 1104, the UPnP control unit 506 takes the server device as the virtual device of the device unit 501 and notifies the content display instruction to the device unit 501 by the UPnP protocol. In step 1105, the device unit 501 notifies the content display instruction to the html content presentation unit 504. In step 1106, the html content presentation unit 504 converts the acquired content display instruction into a content display instruction of the Web protocol which can be understood by the server device, by using the html operation information of the server device registered in step 1102. In step 1107, the content display instruction converted is notified to the server device. In step 1108, the server device notifies the content information as a content list html file to the html content presentation unit 504. In step 1109, the html content presentation unit 504 converts the html file acquired into the content information of the UPnP format. In step 1110, the content information of the UPnP format converted is notified to the device unit 501. In step 1111, the device unit 501 notifies the acquired content information to the UPnP control unit 506. In step 1112, the UPnP control unit 506 notifies the acquired content information to the control device. After this, by the operation not depicted, a desired content is selected from the acquired content information and a content reproduction request is issued to the server device from the control device. That is, such a related operation can be performed.

Thus, according to the operation of FIG. 11, by providing the server support unit 308 including the UPnP control unit 506 the device unit 501, and the html content presentation unit 504 in the gateway device, it becomes possible to access the content information owned by the server device of the Web based discovery and control method from the control device of the UPnP discovery and control method, thereby improving the user-friendliness of the control device.

It should be noted that in this embodiment, the html content presentation unit 504 notifies all the content information presented by the server device to the control device. However, it is also possible to notify only those contents which can be reproduced by the control device among the content information acquired from the server device. The content acquisition method and the content presentation method of the html content presentation unit 504 are not limited to the configuration of this embodiment.

It should be noted that in this embodiment, the browser support unit 307 and the server support unit 308 constituting the network device of FIG. 3 are realized in the form of programs executable in the CPU 203. However, a part or all of the function unit can also be realized by hardware and the configuration method of each function unit is not limited to this.

Moreover, in this embodiment, the browser support unit 307 has the device function link unit 401, the device function presentation unit 402, and the html content presentation unit 403. However, it is also possible to constitute a configuration having at least one of these units or arbitrary two of the units. The configuration of the browser support unit is not limited to the configuration of the present embodiment.

Moreover, in this embodiment, the server support unit 308 has the device unit 501, the proxy response unit 502, the server function presentation unit 503, the http content presentation unit 504, and the connection detection unit 505. However, it is also possible to realize the server support unit by using an arbitrary combination of at least one of these components. The configuration of the server support unit is not limited to the configuration of the present embodiment.

Moreover, in this embodiment, function of the device unit is controlled from the browser device. However, it is also possible to acquire the device unit state and information from the browser device. Linked operation of the device unit and the browser device is not limited to the form of the embodiment.

Moreover, in this embodiment, the server device function is controlled from the control device. However, it is also possible to acquire the server device state and information from the control device. Linked operation of the server device and the control device is not limited to the form of the embodiment.

Embodiment 2

Hereinafter, explanation will be given on a second embodiment of the present invention with reference to FIG. 12. This embodiment relates to a network system including a plurality of gateway devices which perform linked operation.

Figure 12:
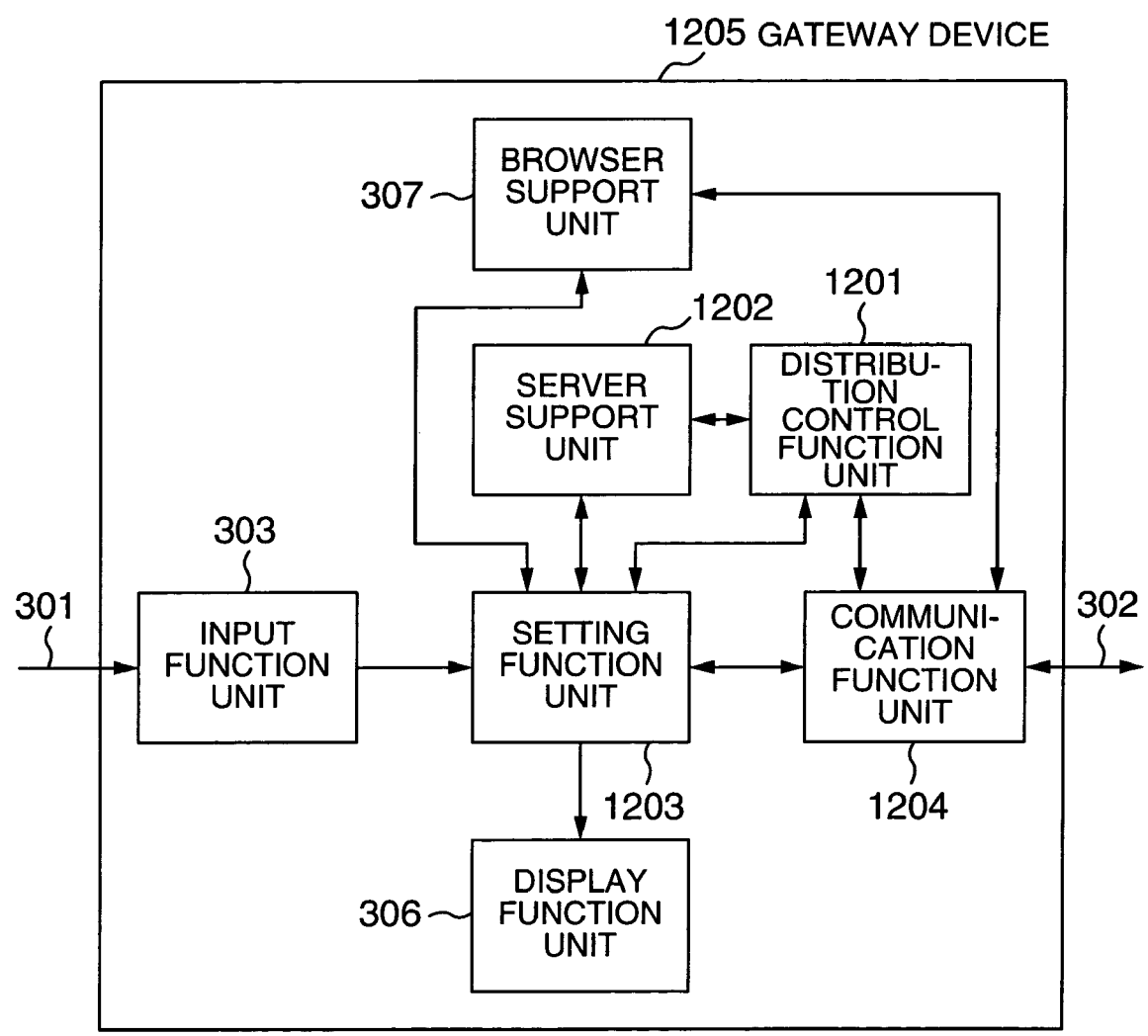
FIG. 12 is a gateway device system block diagram.

In FIG. 12, the reference numeral 303 denotes an input unit equivalent to the input unit 303 of FIG. 3; 306 denotes a display function unit equivalent to the display function unit 306 of FIG. 3; and 307 denotes a browser support unit equivalent to the browser support unit 307 of FIG. 3. The reference numeral 1201 denotes a distribution control function unit for controlling the linked operation of the server support unit of the plurality of gateway devices; 1202 denotes a server support unit compatible of the plurality of gateway devices of the server support function using the distribution control function unit 1201; 1203 denotes a setting function unit equivalent to the setting function unit 304 of FIG. 3; and 1204 denotes a communication function unit equivalent to the communication function unit 305 of FIG. 3. A reference numeral 1205 denotes a gateway device of the embodiment. Aforementioned 301 is input information of the user to the input function unit 303 and 302 is input and output information to the communication function unit 305 in the network 108.

Figure 13:
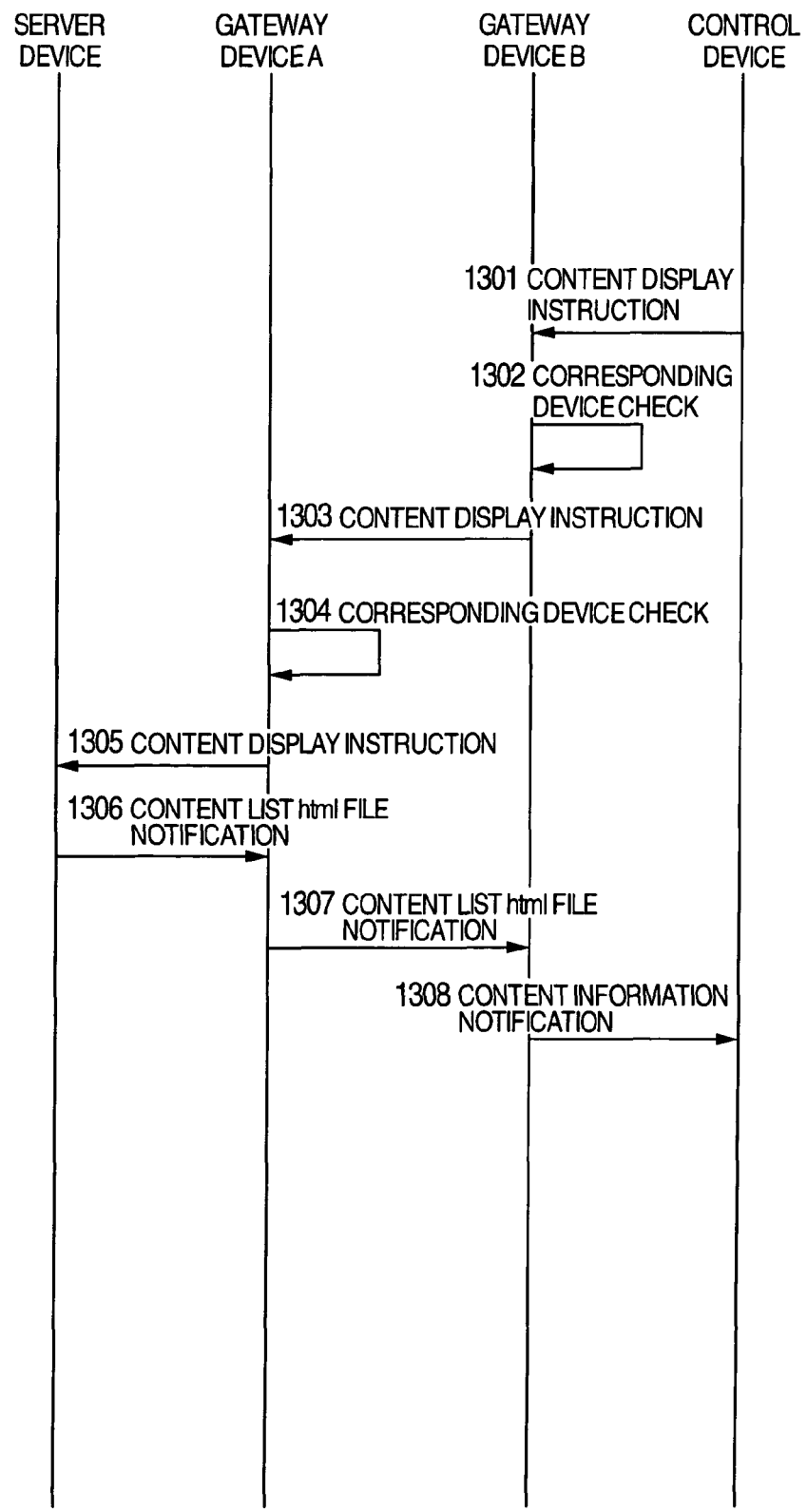
FIG. 13 is a gateway device processing flowchart.
Figure 14:
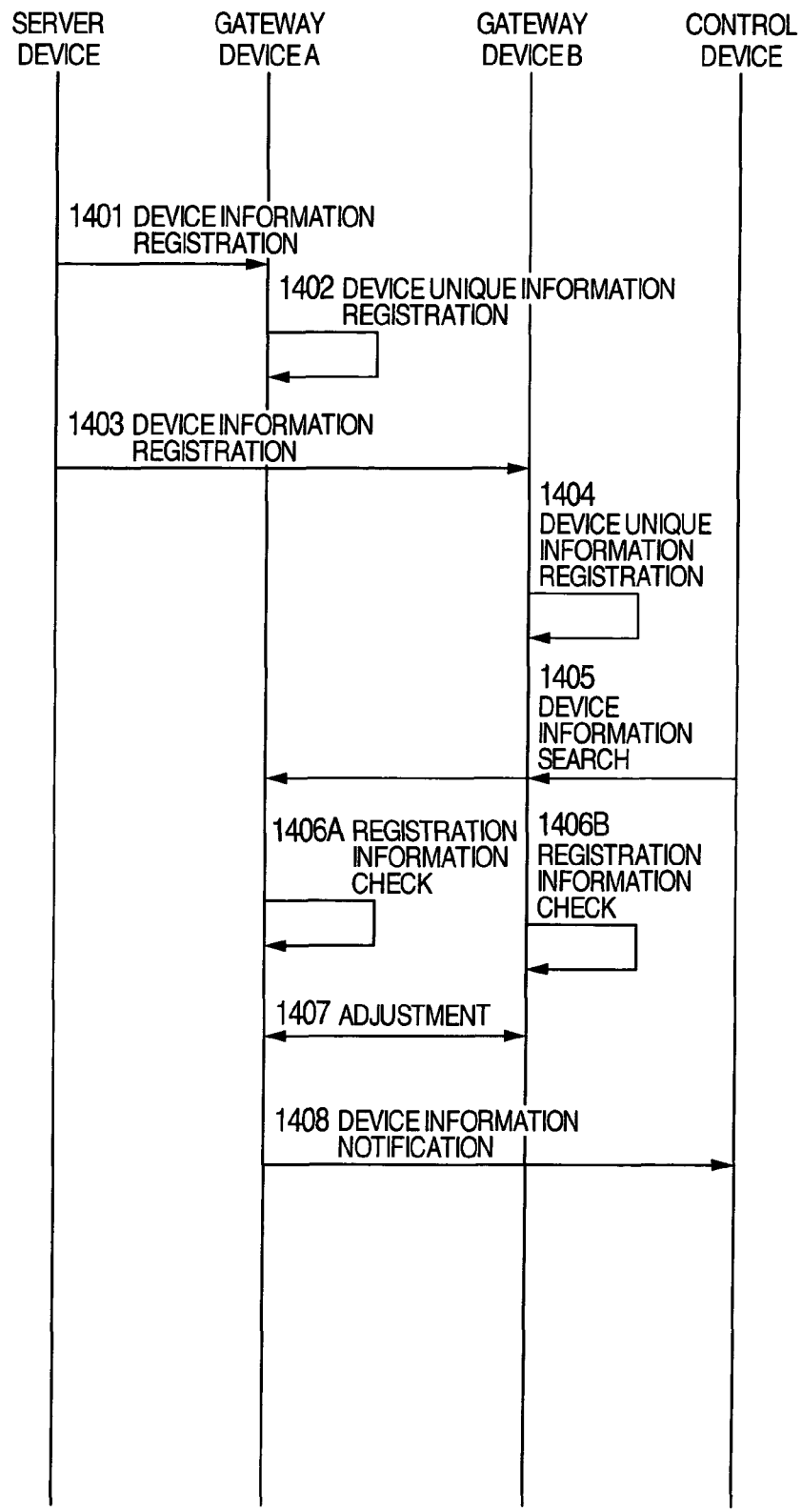
FIG. 14 is a gateway device processing flowchart.

Hereinafter, explanation will be given on the operation of the distribution control function unit 1201 with reference to FIG. 13 and FIG. 14. In FIG. 13, the network system is connected at least to the gateway devices A, B having the distribution control function 1201, the server device, and the control device. In this embodiment, it is assumed that the server device is registered in the gateway device A while the server device is not registered in the gateway device B. In step 1301, the control device notifies the content display instruction by the UPnP protocol. The gateway device B acquires the content display instruction and acquires the content information from the server device by the same processing as FIG. 11. The UPnP control unit, the device unit, the html content presentation unit shown in FIG. 11 also perform the same processes in this embodiment but they are not depicted. Hereinafter, with reference to FIG. 13, explanation will be given on the operation of the distribution control function unit 1201. In step 1302, the network device B checks presence/absence of registered information of the corresponding server device. Here, explanation will be given on the case when no registered information on the server device has been found as a result of the check. In step 1303, the gateway device A notifies the content display instruction to the gateway device A. In step 1304, the gateway device A checks presence/absence of registered information on the server device. Here, explanation will be given on the case when the registered information on the server device is present in the gateway device A. In step 1305, the gateway device A notifies the content display instruction to the server device by the Web protocol. In step 1306, the content list html file is acquired from the server device by the Web protocol. In step 1307, the acquired content list html file is notified to the gateway device B. In step 1308, the gateway device B notifies the acquired content information to the control device by the UPnP protocol.

Thus, by the operation of the gateway device of the present embodiment, in the network system including the server device of the Web based discovery and control method, the control device of the UPnP discovery and control method, and at least two gateway devices, even when one gateway device has no information on a particular server device, the other gateway device inquires information on the server device, thereby enabling the distribution control. This improves the user-friendliness of the gateway device.

Next, explanation will be given on the other operation of the distribution control function unit 120 with reference to FIG. 14. In steps 1401 and 1402, the server device registers device information in the gateway device A. Similarly, in steps 1403 and 1404, the same server device registers device information in the gateway device B. In step 1405, the control device searches the device information concerning the server device in both of the control devices A and B. In steps 1406A and 1406B, the gateway devices A and B check presence/absence of information registered in the server device and confirm that both of the devices have registered information. In step 1407, the gateway devices A and B perform adjustment control to decide which of the gateway devices performs notification of the device information on the server device to the control device. As a result of the adjustment control, in step 1408, the gateway device A acquires the notification right of the device information on the server device to the control device and notifies the device information on the server device to the control device.

Thus, by using the operation of the gateway device of the present embodiment in the network system having the server device of the Web based discovery and control method, the control device of the UPnP control device, and at least two gateway devices, even when a plurality of gateway devices have the same server device information, a particular one gateway device can respond to the inquiry of the control device by the adjustment processing using the distribution control function unit of each gateway device, thereby improving the reliability of the gateway device and user-friendliness of the control device. In addition, in a case where the gateway device A does not have information in relation to the specific gateway device P, the control device Q or the browser device R, the distribution control function unit 1201 of the gateway device A may have a function for inquiring, to the distribution control function unit 1201 of the other gateway device B, information related to the device unit P, the control device Q or the browser device R. In the case of the distribution control function in the embodiment, with use of the distribution control function unit 1201 together with the network connect-disconnect information for the browser device 101, 102 or the server device 103 for sensing the connection detection unit 505, it is possible to use a configuration including a plurality of gateway devices for performing a distributed management. In the case of this configuration, when the gateway devices A and B detect a connection of the server device P, the distribution control function unit 1201 of the gateway devices A and B performs a reconciliation process. At this time, it is possible that the connection detection unit 505 of one of the gateway devices only posts the detection of connecting the server device P. For this reason, it is not required to post the detection of connection for a single server device by the plural gateway devices, enhancing usability. It should be noted that in this embodiment, operation of the server support unit is linked with operation of the distribution control unit and the server device information is distributed to be managed by a plurality of gateway devices so that the information can be used from the control device. However, it is also possible to link the operation of the browser support unit and the distribution control unit and distribute the device unit information to be managed by a plurality of gateway devices so that the information can be used from the browser device.

It should be noted that in the above embodiment, each of the server device of the Web based discovery and control method, the browser device, the control device of the UPnP discovery and control method, the device unit, and the gateway device of the present invention operates as an independent device. However, it is also possible to constitute a composite function having functions of one or more devices. For example, it is possible to constitute a composite function device having the function of the control device and the device unit as well as the function of the gateway device of the present invention. The function of the server device, the function of the browser device, the function of the control device, the function of the device unit, and the function of the gateway device can be used in various combinations.

Moreover, in the above embodiments, the server support means is configured in such a manner that the server device supports the control device corresponding to the UPnP discovery and control method. However, the device unit corresponding to the UPnP discovery and control method can use the server device information or control the server device and the UPnP device as an object of the server support means is not limited to this.

The present invention is applied to a network system having an information processing device of the UPnP discovery and control method (UPnP device) and an information processing device of the Web based discovery and control method (Web device) and by providing a gateway device having a browser support function or server support function, the UPnP device and the Web device can acquire device information and perform device control from/to each other.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A network system comprising:
a first information processing apparatus compatible with a universal-plug-and-play (UPnP) discovery and control method, the method being known as one for controlling a first device operable under the UPnP discovery and control method;
a second information processing apparatus compatible with a Web based discovery and control method, the method being known as one for controlling a second device operable under the Web based discovery and control method using a Web browser function or a Web server function, the first and second information processing apparatuses being connected to each other through a network, the first information processing apparatus being not able to directly communicate with the second device, and the second information processing apparatus being not able to directly communicate with the first device; and
a third information processing apparatus connected to the first and second information processing apparatuses through the network,
wherein the third information processing apparatus comprises:
a browser support unit for performing a conversion between the UPnP discovery and control method and the Web based discovery and control method so as to utilize the first device from the second information processing apparatus; and
a server support unit for performing a conversion between the Web based discovery and control method and the UPnP discovery and control method so as to utilize the second device from the first information processing apparatus,
wherein the browser support unit comprises:
a UPnP control unit for acquiring information on whether the first device has a Web server function in accordance with device information of the first device and URL information of the Web server function of the first device;
a device function link unit for generating an html (hyper text markup language) file when the first device has the Web server function, so that the URL information acquired by the UPnP control unit can be used to access information provided by the Web server function of the first device from the second information processing apparatus through the html file; and
a device function presentation unit for generating an html file when the first device does not have the Web server function, to allow the second information processing apparatus to select a function to control the first device through the html file, the selected function to the first device corresponding to a request for a UPnP protocol, and
wherein the server support unit comprises:
a device unit for acquiring device unique information of the second device, converting the information into a format based on the UPnP protocol for the first information processing apparatus, and receiving an instruction request from the first information processing apparatus; and
a server function presentation unit for receiving the instruction request from the device unit, converting the request into an html operation, and selecting an html file of the second device so that the second device can be controlled by the first information processing apparatus.

2. A network system as claimed in claim 1, wherein the device function presentation unit enables use of at least a part of the function of at least two of first devices compatible with the UPnP discovery and control method from the second information processing apparatus compatible with the Web based discovery and control method and having the Web browser function through the html file.

3. A network system as claimed in claim 1, wherein the browser support unit includes a UPnP content presentation unit for acquiring content-associated information from the first device compatible with the UPnP discovery and control method, and providing the content-associated information to the second information processing apparatus compatible with the Web based discovery and control method and having the Web browser function.

4. A network system as claimed in claim 1, wherein the UPnP content presentation unit provides information only usable in the second information processing apparatus compatible with the Web based discovery and control method and having the Web browser function among the content-associated information acquired from the first device compatible with the UPnP discovery and control method, to the second information processing apparatus compatible with the Web based discovery and control method and having the Web browser function.

5. A network system as claimed in claim 3, wherein the server support unit includes a connection detection unit for detecting a network connection/disconnection state of the second device compatible with the Web based discovery and control method and having the Web server function, and providing information based on the connection/disconnection state to the first information processing apparatus compatible with the UPnP discovery and control method.

6. A network system as claimed in claim 5, wherein the connection detection unit performs communication by the Internet protocol, and identifies a desired second device compatible with the Web based discovery and control method and having the Web server function by using media access control address information on second devices compatible with the Web based discovery and control method and having the Web server function.

7. A network system as claimed in claim 1, wherein the server support unit includes an html content presentation unit capable of providing content-associated information held by the second device compatible with the Web based discovery and control method and having the Web server function used by the first information processing apparatuses compatible with the UPnP discovery and control method, to the first information processing apparatus compatible with the UPnP discovery and control method.

8. A network system as claimed in claim 7, wherein the html content presentation unit provides information only usable in the first information processing apparatus compatible with the UPnP discovery and control method among the content-associated information acquired from the second device, to the first information processing apparatus compatible with the UPnP discovery and control method.

9. A network system according to claim 1, wherein the third information processing apparatus further includes a distribution controlling function unit capable of controlling information of the second device corresponding to the first information processing apparatus together with another third information processing apparatus.

10. A control method for controlling a network system comprising 1) a first information processing apparatus compatible with a universal-plug-and-play (UPnP) discovery and control method, the method being known as one for controlling a first device operable under the UPnP discovery and control method; 2) a second information processing apparatus compatible with a Web based discovery and control method, the method being known as one for controlling a second device operable under the Web based discovery and control method using a Web browser function or a Web server function, the first and second information processing apparatuses being connected to each other through a network, the first information processing apparatus being not able to directly communicate with the second device, and the second information processing apparatus being not able to directly communicate with the first device; and 3) a third information processing apparatus connected to the first and second information processing apparatuses through the network, the control method comprising the steps of:

at a browser support unit of the third information processing apparatus, performing a conversion between the UPnP discovery and control method and the Web based discovery and control method so as to utilize the first device from the second information processing apparatus; and at a server support unit of the third information processing apparatus, performing a conversion between the Web based discovery and control method and the UPnP discovery and control method so as to utilize the second device from the first information processing apparatus, wherein the step at the browser support unit comprises:

at a UPnP control unit of the browser support unit, acquiring information on whether the first device has a Web server function in accordance with device information of the first device and URL information of the Web server function of the first device;

at a device function link unit of the browser support unit, generating an html (hyper text markup language) file when the first device has the Web server function, so that the URL information acquired by the UPnP control unit can be used to access information provided by the Web server function of the first device from the second information processing apparatus through the html file; and at a device function presentation unit of the browser support unit, generating an html file when the first device does not have the Web server function, to allow the second information processing apparatus to select a function to control the first device through the html file, the selected function to the first device corresponding to a request for a UPnP protocol, and wherein the step at the server support unit includes:

at a device unit of the server support unit, acquiring device unique information of the second device, converting the information into a format based on the UPnP protocol for the first information processing apparatus, and receiving an instruction request from the first information processing apparatus; and at a server function presentation unit of the server support unit, receiving the instruction request from the device unit, converting the request into an html operation, and selecting an html file of the second device so that the second device can be controlled by the first information processing apparatus.

11. An information processing device included in a network system comprising 1) a first information processing apparatus compatible with a universal-plug-and-play (UPnP) discovery and control method, the method being known as one for controlling a first device operable under the UPnP discovery and control method; and 2) a second information processing apparatus compatible with a Web based discovery and control method, the method being known as one for controlling a second device operable under the Web based discovery and control method using a Web browser function or a Web server function, the first and second information processing apparatuses being connected to each other through a network, the first information processing apparatus being not able to directly communicate with the second device, the second information processing apparatus being not able to directly communicate with the first device, and the information processing device being connected to the first and second information processing apparatuses, the information processing device comprising:

a browser support unit for performing a conversion between the UPnP discovery and control method and the Web based discovery and control method so as to utilize the first device from the second information processing apparatus; and a server support unit for performing a conversion between the Web based discovery and control method and the UPnP discovery and control method so as to utilize the second device from the first information processing apparatus, wherein the browser support unit comprises:

a UPnP control unit for acquiring information on whether the first device has a Web server function in accordance with device information of the first device and URL information of the Web server function of the first device;

a device function link unit for generating an html (hyper text markup language) file when the first device has the Web server function, so that the URL information acquired by the UPnP control unit can be used to access information provided by the Web server function of the first device from the second information processing apparatus through the html file; and a device function presentation unit for generating an html file when the first device does not have the Web server function, to allow the second information processing apparatus to select a function to control the first device through the html file, the selected function to the first device corresponding to a request for a UPnP protocol, and wherein the server support unit comprises:

a device unit for acquiring device unique information of the second device, converting the information into a format based on the UPnP protocol for the first information processing apparatus, and receiving an instruction request from the first information processing apparatus; and a server function presentation unit for receiving the instruction request from the device unit, converting the request into an html operation, and selecting an html file of the second device so that the second device can be controlled by the first information processing apparatus.

12. An information processing device as claimed in claim 11, wherein the device function presentation unit enables use of at least a part of the function of at least two of first devices compatible with the UPnP discovery and control method from the second information processing apparatus being compatible with the Web based discovery and control method and having the Web browser function through the html file.

13. An information processing device as claimed in claim 11, wherein the browser support unit includes a UPnP content presentation unit for acquiring content-associated information from the first device compatible with the UPnP discovery and control method, and providing the content-associated information to the second information processing apparatus compatible with the Web based discovery and control method and having the Web browser function.

14. An information processing device as claimed in claim 13, wherein the UPnP content presentation unit provides information only usable in the second information processing apparatus compatible with the Web based discovery and control method and having the Web browser function among the content-associated information acquired from the first device compatible with UPnP discovery and control method, to the second information processing apparatus compatible with the Web based discovery and control method and having the Web browser function.

15. An information processing device as claimed in claim 11, wherein the server support unit includes a connection detection unit for detecting a network connection/disconnection state of the second device compatible with the Web based discovery and control method and having the Web server function, and providing information based on the connection/disconnection state to the first information processing apparatus compatible with the UPnP discovery and control method.

16. An information processing device as claimed in claim 15, wherein the connection detection unit performs communication by the Internet protocol, and identifies a desired second device compatible with the Web based discovery and control method and having the Web server function by using media access control address information on second devices compatible with the Web based discovery and control method and having the Web server function.

17. An information processing device as claimed in claim 11, wherein the server support unit includes an html content presentation unit capable of providing content-associated information held by the second device compatible with the Web based discovery and control method and having the Web server function used by the first information processing apparatus compatible with the UPnP discovery and control method, to the first information processing apparatus compatible with the UPnP discovery and control method.

18. An information processing device as claimed in claim 17 wherein the html content presentation unit provides information only usable in the first information processing apparatus compatible with the UPnP discovery and control method among the content-associated information acquired from the second device, to the first information processing apparatus compatible with the UPnP discovery and control method.

19. An information processing device according to claim 11, further comprising a distribution controlling function unit capable of controlling information of the second device corresponding to the first information processing apparatuses together with another information processing device.

* * * * *